(12) United States Patent
Arippol

(10) Patent No.: US 7,575,649 B2
(45) Date of Patent: *Aug. 18, 2009

(54) LABEL STRUCTURE AND LABEL STRUCTURE OBTAINING METHOD

(76) Inventor: Jeffrey Arippol, Av. Dracena, 450-Jaguare, 05329-0000, Sao Paulo, SP (BR)

( * ) Notice: Subject to any disclaimer, the term of this patent is extended or adjusted under 35 U.S.C. 154(b) by 288 days.

This patent is subject to a terminal disclaimer.

(21) Appl. No.: 11/473,216

(22) Filed: Jun. 21, 2006

(65) Prior Publication Data

US 2007/0295439 A1 Dec. 27, 2007

(51) Int. Cl.
*B32B 37/00* (2006.01)
(52) U.S. Cl. .................. 156/73.1; 156/270; 156/277
(58) Field of Classification Search ............... 156/73.1, 156/270, 277, 384, 387, 510, 580.1, 580.2
See application file for complete search history.

(56) References Cited

U.S. PATENT DOCUMENTS

| | | | |
|---|---|---|---|
| 3,518,145 A | 6/1970 | Christensen | |
| 4,300,700 A | 11/1981 | Chang | |
| 4,956,962 A | 9/1990 | Williams | |
| 5,051,263 A | 9/1991 | Barry et al. | |
| 5,078,509 A | 1/1992 | Center et al. | |
| 5,405,629 A | 4/1995 | Marnocha et al. | |
| 5,582,853 A | 12/1996 | Marnocha et al. | |
| 5,626,250 A | 5/1997 | Dorazio | |
| 5,639,529 A | 6/1997 | Gozdecki | |
| 5,707,470 A | 1/1998 | Rajala et al. | |
| 5,711,847 A | 1/1998 | Rajala et al. | |
| 6,461,708 B1 | 10/2002 | Dronzek | |
| 6,502,986 B1 | 1/2003 | Bensur et al. | |
| 6,537,401 B2 | 3/2003 | Couillard et al. | |
| 6,540,854 B2 | 4/2003 | Couillard et al. | |
| 6,547,903 B1 | 4/2003 | McNichols et al. | |
| 6,585,153 B2 | 7/2003 | Ryan | |
| 6,594,927 B2 | 7/2003 | Witkowski | |
| 6,613,171 B2 | 9/2003 | McNichols et al. | |

(Continued)

OTHER PUBLICATIONS

U.S. Appl. No. 10/867,769, filed Jun. 25, 2004, Arippol.

(Continued)

*Primary Examiner*—James Sells
(74) *Attorney, Agent, or Firm*—Stattler-Suh PC

(57) ABSTRACT

A label structure and a method for obtaining the label structure are described. A self-adhesive web of material continuously advances at a predetermined speed along a path between an ultrasonic horn assembly and a rotary anvil, the self-adhesive web of material of a type originally used for the obtaining of labels or other self-adhesive products. The ultrasonic horn assembly is further activated to move along its vertical axis and further transmits ultrasound wave signals when contacting the web of material. The rotary anvil welds predetermined strips onto the web of material, the predetermined strips inhibiting silicone from cross bands and from side longitudinal bands of a silicone layer of the silicone-coated plastic tape of the web of material, which will form back end cross bands, intermediate transversal bands and longitudinal bands, such that the silicone layer of the silicone-coated plastic tape and end cross bands, intermediate cross bands, and longitudinal bands of the self-adhesive tape are permanently coupled, respectively, over the end cross bands, intermediate cross bands, and longitudinal bands of the silicone layer of the silicone-coated plastic tape.

6 Claims, 10 Drawing Sheets

U.S. PATENT DOCUMENTS

| | | |
|---|---|---|
| 6,620,270 B2 | 9/2003 | Ehlert et al. |
| 6,634,539 B2 | 10/2003 | Mlinar et al. |
| 6,668,892 B2 | 12/2003 | Vasilakes et al. |
| 6,676,003 B2 | 1/2004 | Ehlert et al. |
| 6,685,046 B2 | 2/2004 | Ogino |
| 6,685,085 B2 | 2/2004 | Hanna |
| 6,723,360 B1 | 4/2004 | Dunaway |
| 6,733,855 B1 | 5/2004 | Scott |
| 7,022,197 B2 | 4/2006 | Sitzmann |
| 7,025,841 B2 | 4/2006 | Owen |
| 7,172,220 B2 * | 2/2007 | Franko, Sr. .................. 283/81 |
| 2003/0056410 A1 | 3/2003 | Witkowski |
| 2003/0217489 A1 | 11/2003 | Witkowski |
| 2006/0054268 A1 | 3/2006 | Pacione et al. |
| 2006/0110561 A1 * | 5/2006 | Arippol ..................... 428/40.1 |

OTHER PUBLICATIONS

U.S. Appl. No. 11/201,022, filed Aug. 9, 2005, Arippol.
U.S. Appl. No. 10/938,858, filed Sep. 9, 2004, Arippol.

* cited by examiner

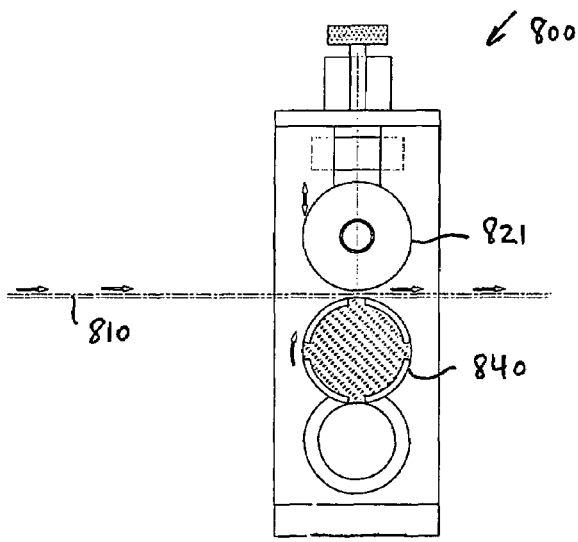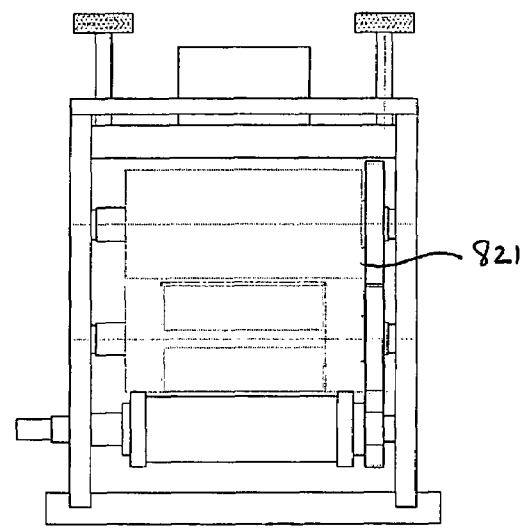
FIG. 11A    FIG. 11B
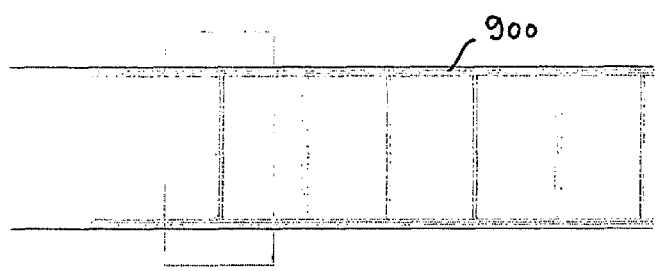
FIG. 11C

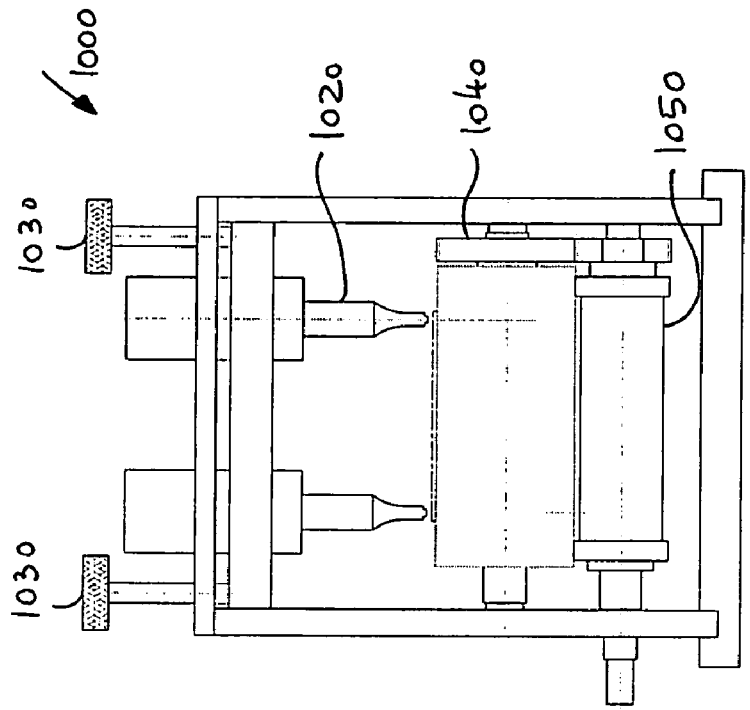
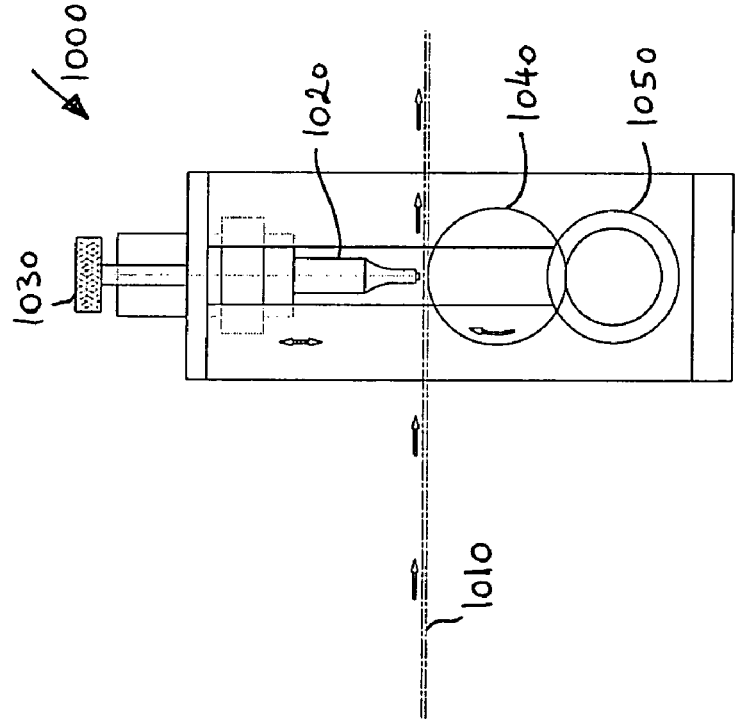
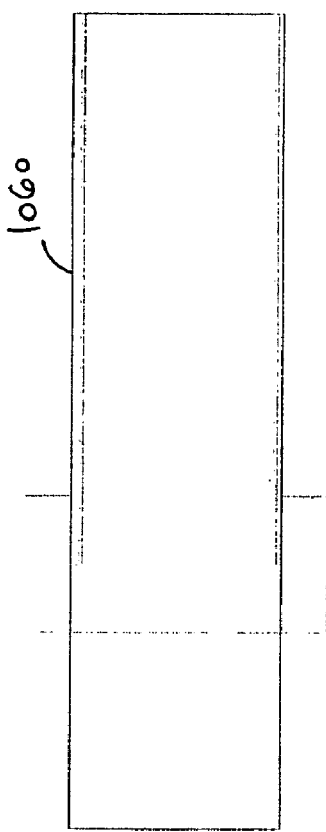
Fig. 12B
Fig. 12C
Fig. 12A

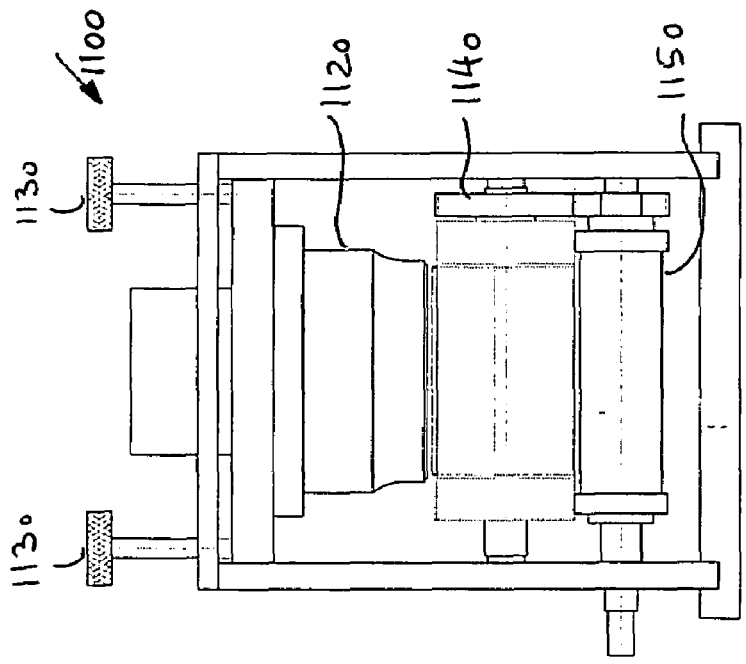
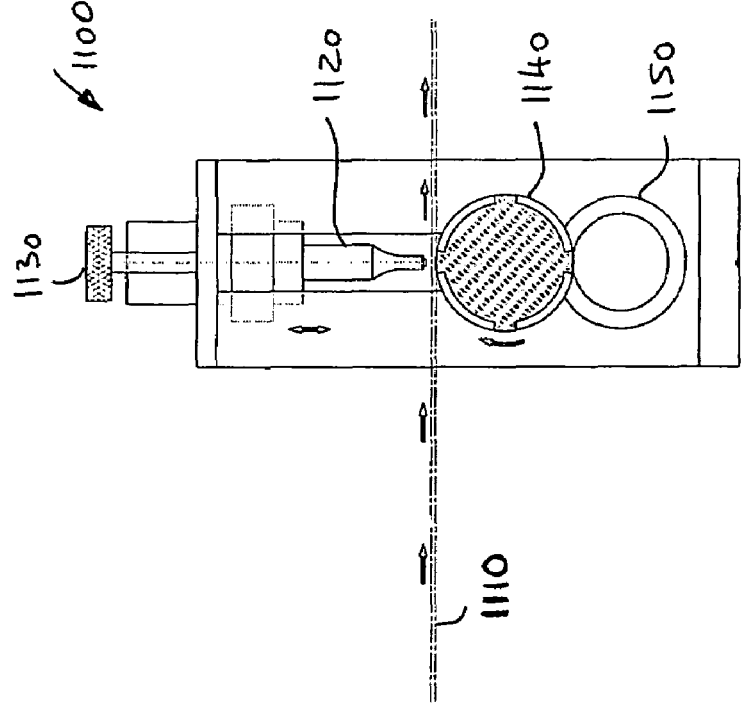
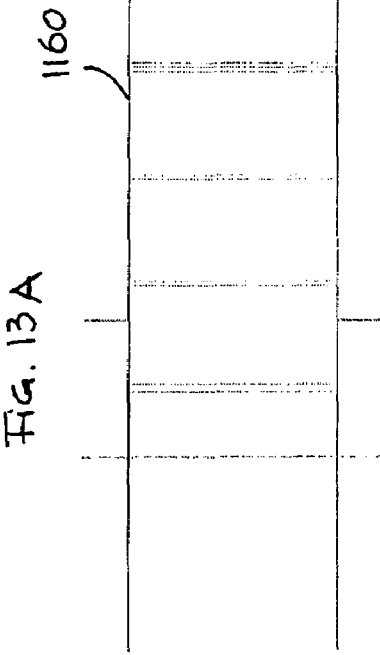
Fig. 13A
Fig. 13B
Fig. 13C

LABEL STRUCTURE AND LABEL STRUCTURE OBTAINING METHOD

BACKGROUND

1. Field of the Invention

The present invention relates generally to manufacturing technologies and, more specifically, to an improved label structure and a method for obtaining such label structure.

2. Background

Labels comprised essentially of the following are already known: a label body, the surface of which is turned inward, which has a printing layer comprising the label itself and the surface turned inwards, and has adhered thereto label(s) containing gift(s), coupon(s) or similar products, which may be accessed and used according to their characteristics by the final user of the product with such label affixed.

Notwithstanding such kind of label being proper for its intended purposes, in certain applications, it would be advantageous to provide a better confinement of the labels containing gifts, coupon or others when the label is applied, thus avoiding an attempt of undue access thereto. It would also be advantageous to provide a continuous surface throughout the back area of the label body, comprised of the labels and a frame surrounding the labels, which avoids the creation of occasional marking of the label edges on the outer surface of the label body or avoids the formation of interstitial between the upper and lower edges of the label body and the surface of the receiving package, which facilitate the undue access to the labels or the penetration and accumulation of dirt or other aggressive agents or that facilitates said upper and lower edges of the label body to get caught inadvertently in any other surface and tear up the label body.

SUMMARY

A label structure and a method for obtaining the label structure are described, the label structure being provided, in the front surface, with a printing layer and, on the back surface, with silicone layer and end cross gluing surfaces; self-adhesive inner labels, formed by a self-adhesive plastic label body or other similar compound material, the front surface of which is provided with a printing layer and the back surface with a pressure-sensitive adhesive layer; the back surface of the silicone-coated label body being provided with regions of silicone layers arranged in accordance with the self-adhesive inner labels and of bands around said silicone layer regions, coupled through an ultrasonic welding process in order to inhibit the silicone; the back surface of the silicone-coated label body being covered by a self-adhesive plastic body provided, in the surface opposite to that facing the silicone-coated label body, with the printing layer and in the surface facing the silicone-coated label body, with a pressure-sensitive adhesive layer; said self adhesive body being also provided with cuts, which define the shapes of the inner labels and of the bands around them; said inner labels being glued so as to be unglued over the respective silicone layer regions and the bands around the inner labels being permanently coupled to the bands around the silicone layer regions, respectively.

In one embodiment, a self-adhesive web of material continuously advances at a predetermined speed along a path between an ultrasonic horn assembly and a rotary anvil, the self-adhesive web of material of a type originally used for the obtaining of labels or other self-adhesive products, with a predetermined width and comprising a silicone-coated plastic tape; an intermediate silicone layer arranged in an inner surface of the silicone-coated plastic tape; an intermediate pressure-sensitive adhesive layer glued so as to be detached on the silicone layer; and of a plastic tape opposite to the silicone-coated plastic tape, which contains a pressure-sensitive adhesive layer, a surface of the silicone-coated tape facing outwardly, opposite to that containing the silicone layer, being printed in a succession of prints to form a plurality of labels, properly spaced from each other and in intervals between the prints corresponding to one of the label ends, printing marks, which work in collaboration with an optical reader in the label application operation, an outer surface of the self-adhesive plastic tape, opposite to that containing the adhesive layer, being printed at regular intervals to form inner labels containing gifts or coupons or similar products.

The ultrasonic horn assembly is further activated to move along its vertical axis and further transmits ultrasound wave signals when contacting the web of material and the rotary anvil to weld predetermined strips onto the web of material, the predetermined strips inhibiting silicone from cross bands and from side longitudinal bands of the silicone layer of the silicone-coated plastic tape, which will form back end cross bands, intermediate transversal bands and longitudinal bands, such that the silicone layer of the silicone-coated plastic tape and end cross bands, intermediate cross bands, and longitudinal bands of the self-adhesive tape are permanently coupled, respectively, over said end cross bands, intermediate cross bands, and longitudinal bands of the silicone layer of the silicone-coated plastic tape.

The self-adhesive tape is further cut without cutting the silicone-coated plastic tape and without extracting the bands arising from the labels to define in the self-adhesive tape shapes of the self-adhesive inner labels and the end cross bands, intermediate cross bands, and longitudinal bands and the tape of labels is rewound when the labels are supplied in the form of a label tape or cut from the label tape when they are supplied already cut in the form of individual labels.

BRIEF DESCRIPTION OF THE DRAWINGS

FIG. 11A illustrates a sectional view of the ultrasonic welding apparatus which implements the label structure obtaining method, according to an alternate embodiment of the invention;

FIG. 11B illustrates a frontal view of the ultrasonic welding apparatus which implements the label structure obtaining method, according to the alternate embodiment of the invention;

FIG. 11C illustrates the resulting web of material at the output of the ultrasonic welding apparatus, having both longitudinal and transversal welded strips, according to the alternate embodiment of the invention;

FIG. 12A illustrates a sectional view of an ultrasonic welding apparatus which implements the label structure obtaining method, according to another alternate embodiment of the invention;

FIG. 12B illustrates a frontal view of the ultrasonic welding apparatus which implements the label structure obtaining method, according to the other alternate embodiment of the invention;

FIG. 12C illustrates the resulting web of material at the output of the ultrasonic welding apparatus, having longitudinal welded strips, according to the other alternate embodiment of the invention;

FIG. 13A illustrates a sectional view of an ultrasonic welding apparatus which implements the label structure obtaining method, according to a subsequent alternate embodiment of the invention;

FIG. 13B illustrates a frontal view of the ultrasonic welding apparatus which implements the label structure obtaining method, according to the subsequent alternate embodiment of the invention;

FIG. 13C illustrates the resulting web of material at the output of the ultrasonic welding apparatus, having transversal welded strips, according to the subsequent alternate embodiment of the invention.

DETAILED DESCRIPTION

As described in detail below and as illustrated in the figures, the label structure subject to this invention is of a type comprised essentially: of a label body with length slightly longer than the perimeter of the receiver package that, when applied, surrounds the whole package and its ends receive glue at the time of the application and remain superposed, a first end being glued on the package and the other on the first; and of self-adhesive label(s) containing gift(s), coupon(s) or similar products originally glued on the back face of the label body, and which may be accessed when it is torn. In the following description, label and label structures are used interchangeably and refer to the same structure subject of the present invention.

Figure 1:
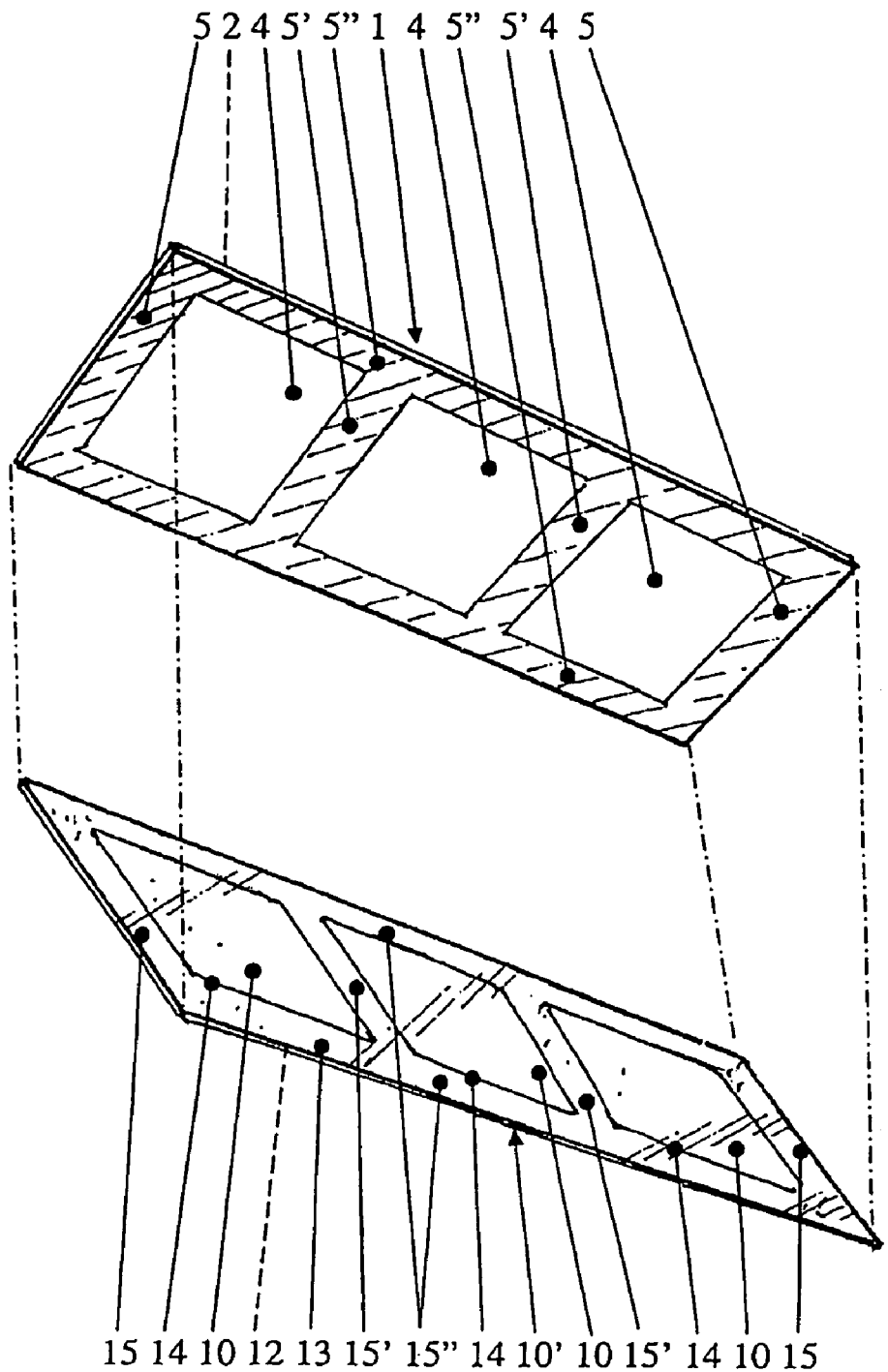
FIG. 1 illustrates a frontal view of a label structure having a silicone-coated label body and a self-adhesive body, according to one embodiment of the invention.
Figure 2:
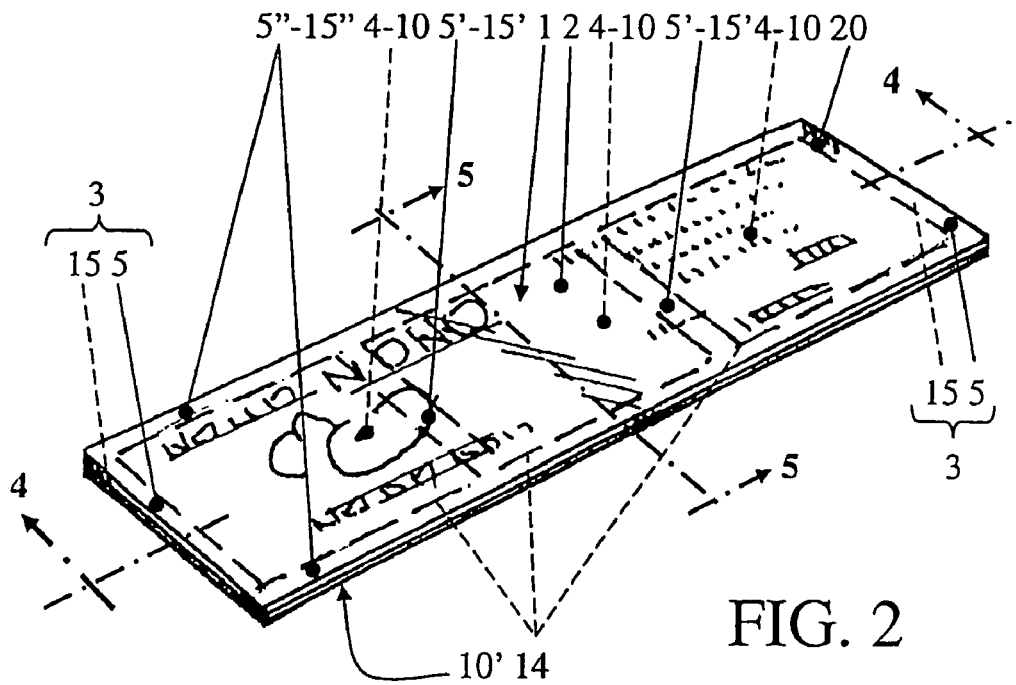
FIG. 2 illustrates a frontal view of the label front, when applied to a package, according to one embodiment of the invention.
Figure 3:
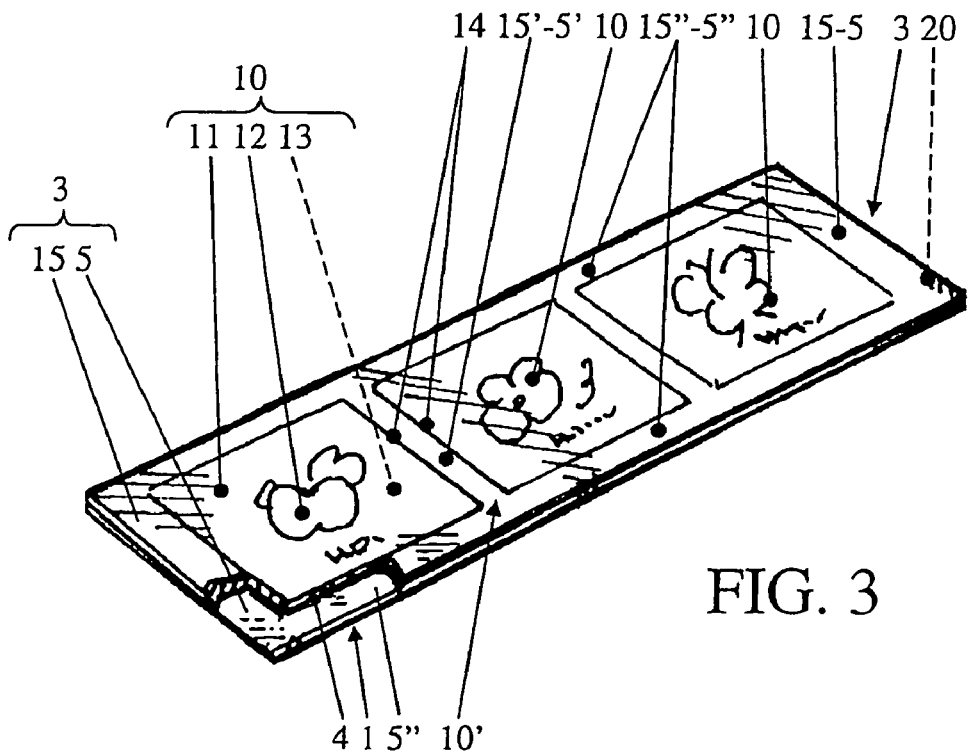
FIG. 3 illustrates a frontal view of the label structure from the opposite side, with a partial sectional view of the label structure, according to one embodiment of the invention.
Figure 4:
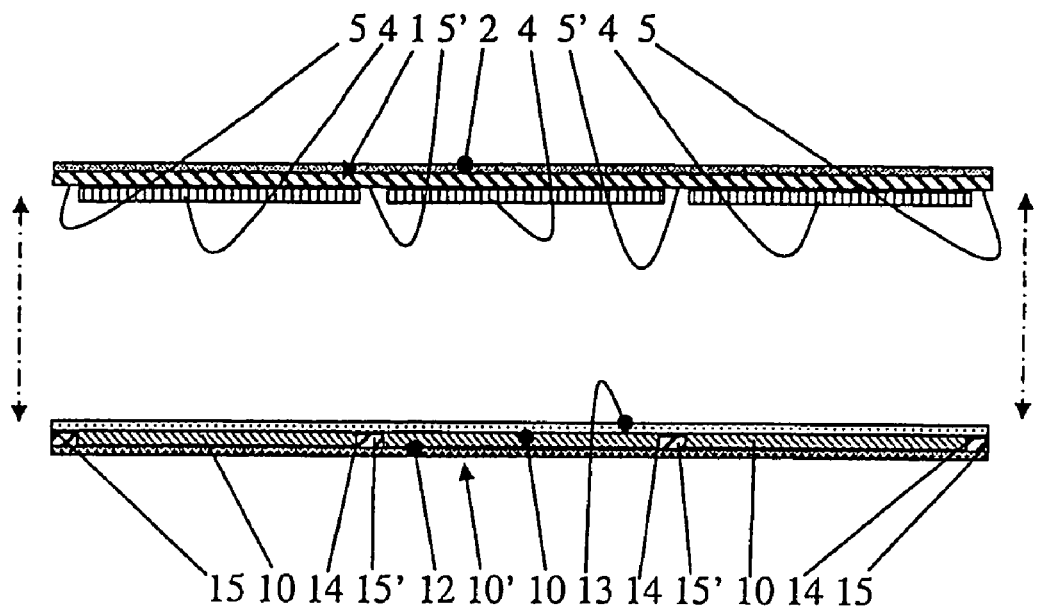
FIG. 4 illustrates a sectional view of the label structure, with the silicone-coated label body separated from the self-adhesive body, which contains the labels, according to one embodiment of the invention.
Figure 5:
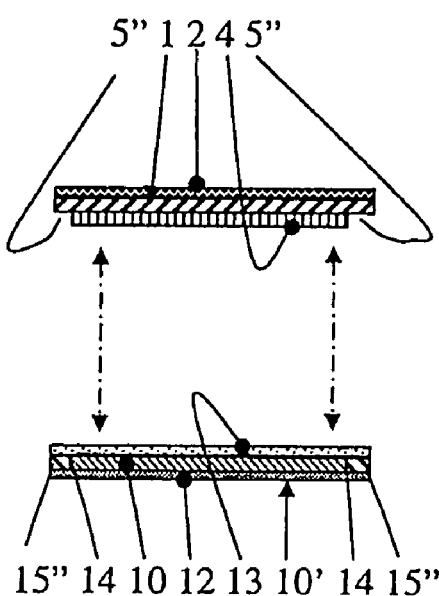
FIG. 5 illustrates another sectional view of the label structure, with the silicone-coated label body separated from the self-adhesive body, according to one embodiment of the invention.

As illustrated in FIGS. 1 and 2, in one embodiment, the label structure is comprised: of a silicone-coated plastic label body 1 provided, in the front face, of a printing layer 2, comprised the label itself; and, on the back face, of silicone layer and end cross gluing surfaces 3, said label structure is also comprised of self-adhesive inner labels 10, formed by self-adhesive plastic label body 11, the front face of which is provided with a printing layer 12, which configures the label itself and, in the back face, said self-adhesive body 11 is provided with a pressure-sensitive adhesive layer 13.

The present invention aims at providing a label structure of the type above, the bands of which around the labels 10 are covered, in order to allow better confinement of the labels 10 when the product label is applied on the package and other advantages. For such purpose, in one embodiment, instead of the silicone-coated label body 1 having the back face fully covered with silicone, excepting in the gluing cross end surfaces 3, said label structure has the back surface of the silicone-coated label body 1 provided with regions of silicone layers 4 arranged in accordance with the self-adhesive inner labels 10, and with bands around said silicone layer regions 4, in which the silicone was inhibited, to wit: two end cross bands 5, defined between the end silicone layer regions 4 and the cross edges of the silicone label body 1; intermediate cross band(s) 5', defined between the silicone layer regions 4 and two longitudinal bands 5", defined between the silicone layer regions 4 and the longitudinal edges of the silicone-coated label body 1.

In one embodiment, as shown in FIGS. 1 through 5, the back face of the silicone-coated label body 1 is covered by a self-adhesive plastic body 10' provided, in the face opposite to that facing the silicone-coated label body 1, with the printing layer 12 configuring the labels themselves 10 and, in the face facing the silicone-coated label body 1, said self-adhesive body 10' is provided with a pressure-sensitive adhesive layer 13; said self adhesive body 10' is also provided with cuts 14, which define the shapes of the inner labels 10 and of the bands around them, as follows: two end cross bands 15, defined between the end labels and the cross edges of the self-adhesive body 10'; intermediate cross band(s) 15', defined between the labels; and two longitudinal bands 15", defined between the labels and the longitudinal edges of the self-adhesive body 10'; said inner labels 10 are glued so as to be unglued over the respective silicone layer regions 4 of the silicone-coated label body 1 and bands 15, 15' and 15" are permanently coupled to the bands 5, 5' and 5" with inhibited silicone, respectively, and are arranged around the silicone layer regions 4 of the silicone-coated label body 1.

This label structure is provided with end cross gluing surfaces 3 formed by the outer surfaces of the end cross bands 15 of the self-adhesive body 10', glued permanently on the end cross bands 5 with inhibited silicone of the silicone-coated label body 1. The longitudinal bands 15' of the self-adhesive body 10', adhered permanently on the corresponding longitudinal bands 5" with inhibited silicone of the silicone-coated label body 1, are devices to optimize the confinement of the self-adhesive inner labels 10, when the label is applied on the package.

The label structure of this invention may also be provided with a mark 20 in order to actuate in collaboration with a sensor of the usual application equipment.

The label structure according to this invention may be provided in a label tape, which contains a succession of labels and that is supplied as a reel, which labels are cut from the tape at the application time. Optionally, the labels may be supplied already cut, individualized, for the final user.

Detailing the application of the label structure built according to this invention, glue is applied over the end cross gluing surfaces 3 and thereafter the label structure is applied on the receiver package, by gluing one of the ends on it, arranging the label around said package and gluing the opposite end 3 on the first end that was glued over the package.

The label structures are applied by usual applier equipment (not illustrated) of a type able to operate with a label tape, when therefore it comprises mainly the following assemblies: label tape unwinder; of label cutting to separate it from the remaining tape; of label application; and of label application around the receiver package or equipment able to operate with individualized labels, comprised essentially of a magazine for individual supply of the labels and label application stations and label application around the package.

Figure 6:
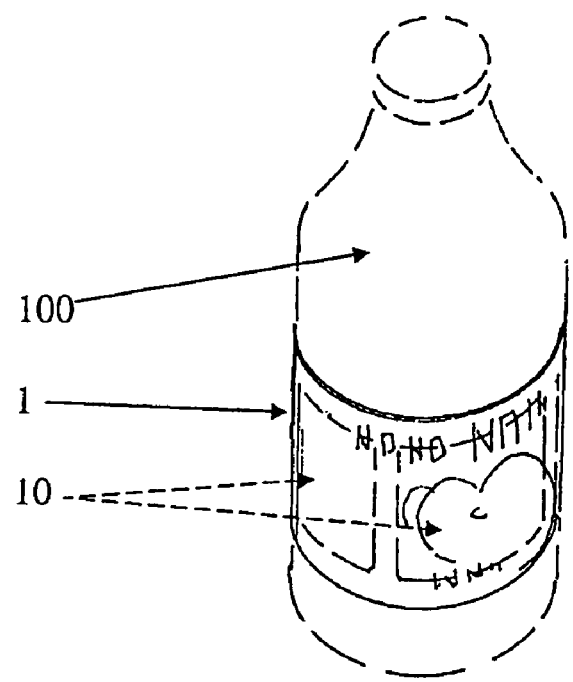
FIGS. 6 and 7 illustrate the label structure applied on a package and being taken off the package for access to its internal labels, respectively, according to one embodiment of the invention.

The label structures of this invention, when applied on a package 100 (FIG. 6) have the silicone-coated label body 1 glued on it through the cross end gluing surfaces 3 and with its self-adhesive inner labels 10 containing gifts or coupons or similar products contained between the label body 1, the back longitudinal bands 15" of the self-adhesive body 10, adhered on the label body 1 and the package surface 100.

Figure 7:
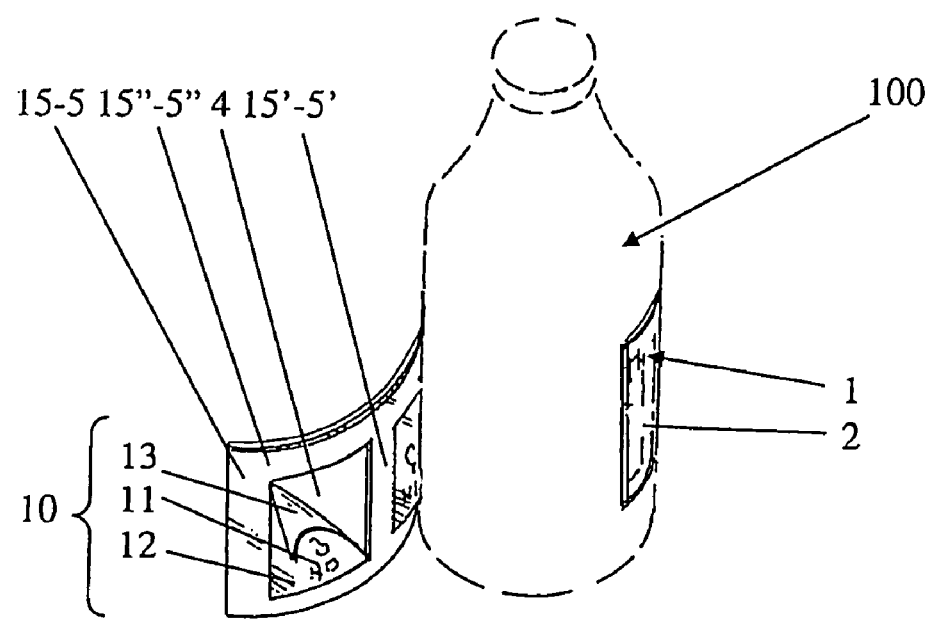

For access to the inner labels 10 (FIG. 7), for example, the upper gluing surface 3 is detached from the lower surface 3 and the latter from the package 100 and the inner labels 10 are detached from the silicone layer regions 4 of the back of the label body 1 and said inner labels 10 are glued on any surface, according to the their purpose, through their adhesive layers 13.

The label structure of this invention is obtained by an obtaining method comprised (FIG. 8) essentially of the following stages:

1) To provide a self-adhesive material tape reel of a type originally used for the obtaining of labels or other self-adhesive products, with proper width and comprised essentially of silicone-coated plastic tape 1'; of an intermediate silicone layer 4' arranged in the inner face of tape 1'; of an intermediate pressure-sensitive adhesive layer 13' glued so as to be detached on the silicone layer 4'; and of a plastic tape 10" opposite to the silicone-coated plastic tape 1', which contains the pressure-sensitive adhesive layer 13' and unwind said self-adhesive material tape from an unwinder located at the inlet end of the manufacturing equipment, making the traction thereof through a rewinder located at the opposite end of the equipment, so as to cause such tape to pass through the several manufacturing stages;

2) To print on the face of the silicone-coated tape 1' facing outwards, opposite to that containing the silicone layer 4', a succession of prints forming the labels themselves 2', properly spaced from each other and in the intervals between said prints corresponding to one of the label ends, to print the marks 20, which work in collaboration with optical reader in the label application operation;

3) To print on the outer face of the self-adhesive tape 10', opposite to that containing the adhesive layer 13', prints at regular intervals forming the inner labels 10 containing gifts or coupons or similar products;

4) To couple predetermined portions of the silicone layer 4' of the tape 1' to corresponding portions of the self-adhesive tape 10' through an ultrasonic welding process within an ultrasonic welding system 801, which activates the heat sealing property of the adhesive filming material to overcome the silicone layer for a predetermined ultrasound wavelength, as described in further detail below, thereby inhibiting the silicone from the surface of the cross bands and from the surface of the two side longitudinal bands of the silicone layer 4' of the silicone-coated tape 1';

5) To die-cut the self-adhesive tape 10' without cutting the silicone-coated tape 1' and without extracting the "frame" (bands arising the labels) to define in said self-adhesive tape 10' the shapes of the self-adhesive inner labels 10 and the end cross bands 15, intermediate cross band 15' and longitudinal bands 15", thus forming a tape of labels comprised of a silicone-coated plastic tape 1', in which front face it is foreseen a printing layer 2', configuring a succession of labels themselves and, in the back face, there is the forecast of silicone layer regions 4' and, between said regions 4' and between them and the cross and longitudinal edges of the label tape, end cross bands 5, intermediate cross bands 5', and longitudinal bands 5" with inhibited silicone; said label tape being also composed by a self-adhesive plastic tape 10' provided, on the surface opposite to that facing the silicone-coated tape 1', with a printing layer 12', forming a succession of inner label 10 containing gift or coupon or similar; said self-adhesive tape 10' being also provided with cuts 14' that define the shapes of the inner labels 10 and of the cross bands 15 and 15' and longitudinal bands 15" arranged around the labels, said self-adhesive tape 10' being also provided, on the face turned to the silicone-coated tape 1', with pressure-sensitive adhesive layer 13', which regions corresponding to inner labels 10 are glued so as to be detached from the silicone regions 4' and the regions of said adhesive layer 13' corresponding to the end cross bands 15, intermediate cross band 15', and longitudinal bands 15" are permanently adhered on the corresponding end cross bands 5, intermediate bands 5', and longitudinal bands 5" with inhibited silicone of the silicone-coated tape 1', the end cross bands 15 of said self-adhesive tape 10', permanently adhered on the end cross bands 5 with inhibited silicone of the silicone-coated tape 1', being the gluing surfaces 3 of the label and the longitudinal bands 15" of said self-adhesive tape 10', permanently coupled to the longitudinal bands 5" with inhibited silicone of the silicone-coated tape 1' being a device to optimize the confinement of the inner labels 10 when the label is applied on the receiver package; and 6) To rewind the tape of labels when they are supplied in the form of a label tape or to cut the label tape when they are supplied already cut in the form of individual labels.

The self-adhesive material tape from which the labels are obtained may have a predetermined width for obtaining a queue of labels or more than one parallel label queues. The prints 2 comprising the labels themselves and prints (3) of the inner label 10 can be done by any proper printing system, in one or more colors.

Figure 8:
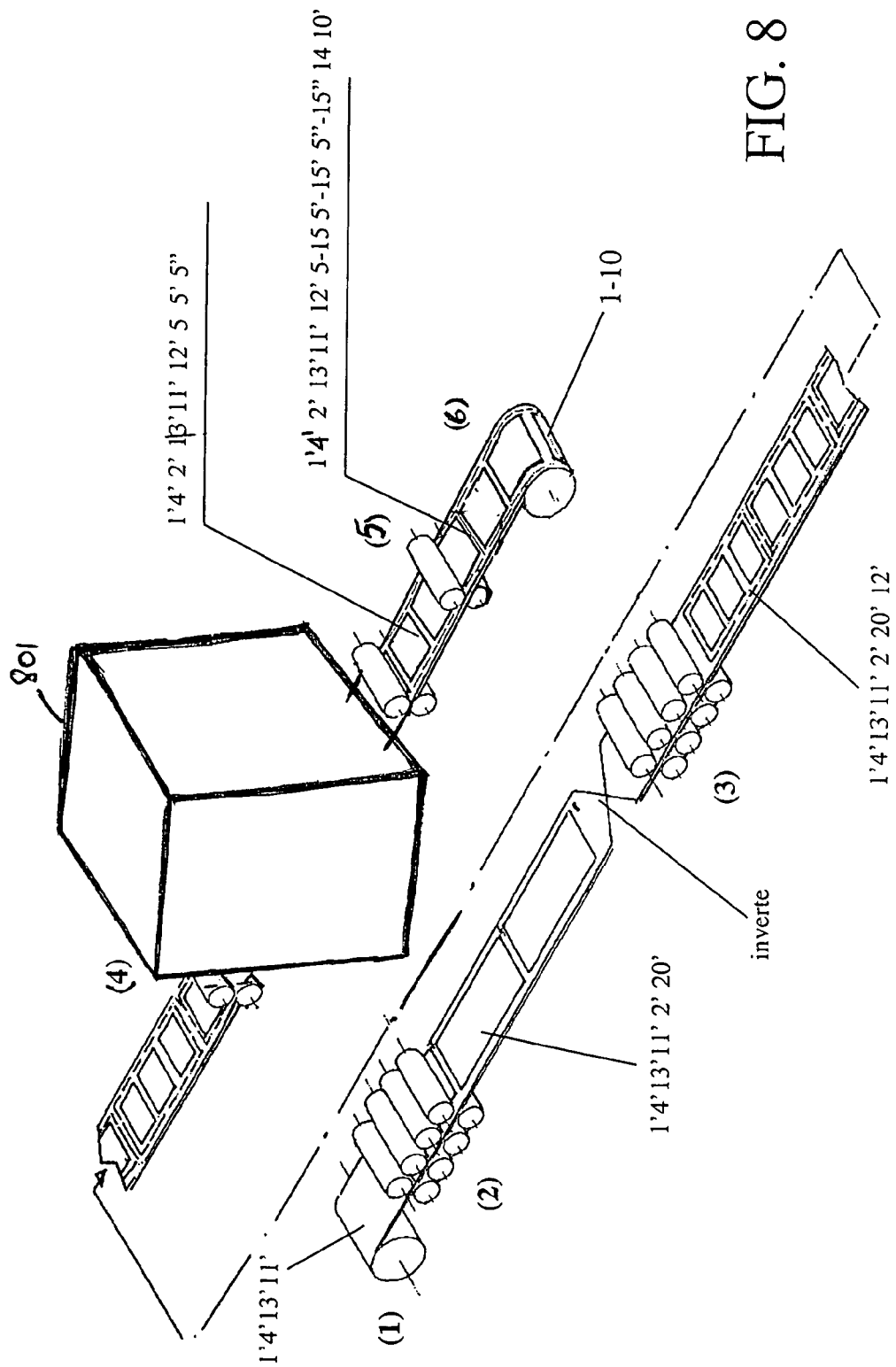
FIG. 8 illustrates a diagram of the label structure obtaining method, according to one embodiment of the invention.
Figure 9:
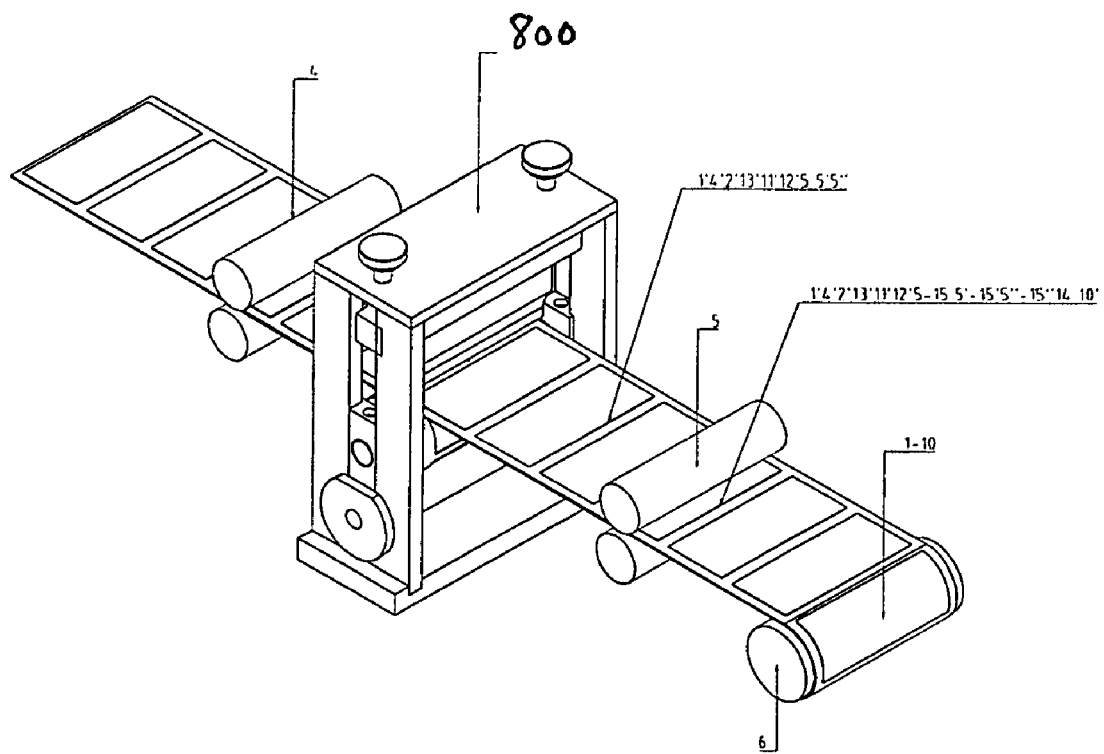
FIG. 9 illustrates the label structure obtaining method including an ultrasonic welding apparatus, according to one embodiment of the invention.

FIG. 9 illustrates the label structure obtaining method including an ultrasonic welding apparatus 800, according to one embodiment of the invention. As shown in FIG. 9, in one embodiment, the ultrasonic welding apparatus 800 resides within the ultrasonic welding system 801 shown in FIG. 8 and is configured to couple predetermined portions of the silicone layer 4' of the tape 1' to corresponding portions of the self-adhesive tape 10' through an ultrasonic welding process described in detail below in connection with FIGS. 10A-C and 11A-C.

Figure 10A:
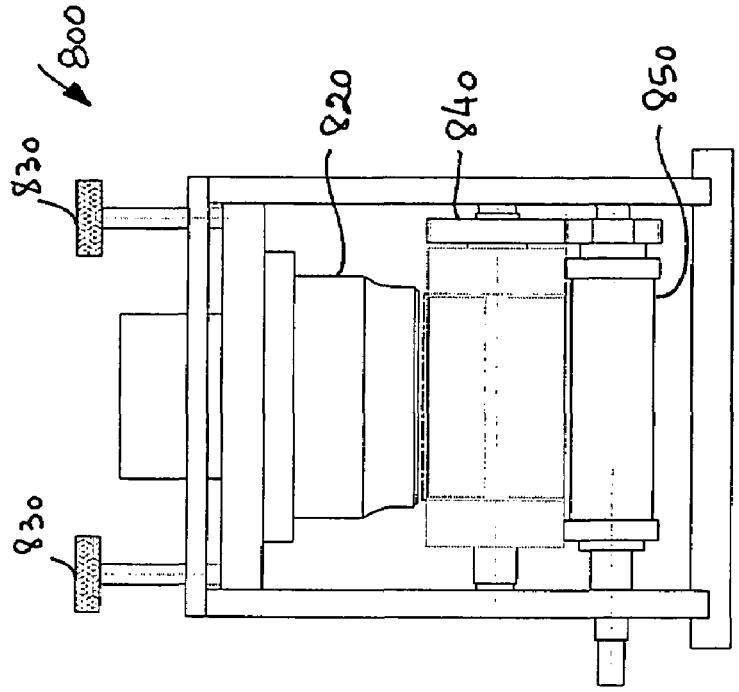
FIG. 10A illustrates a sectional view of the ultrasonic welding apparatus which implements the label structure obtaining method, according to one embodiment of the invention.

FIG. 10A illustrates a sectional view of an ultrasonic welding apparatus which implements the label structure obtaining method, according to one embodiment of the invention. As shown in FIG. 10A, in one embodiment, a web of material 810, such as, for example, the label tape described in detail above in connection with FIGS. 1 through 8, passes through an ultrasonic welding apparatus 800 further including a horn assembly 820, such as, for example, a non-rotating horn, and a rotary anvil 840 coupled to a control cylinder assembly 850.

In one embodiment, the horn assembly 820 is constructed from a material having good ultrasound wave conduction and durability properties, such as, for example, titanium, although it is to be understood that other conductive materials able to propagate ultrasound waves may also be used in lieu of titanium, without departing from the scope of the invention. The horn assembly 820 is further coupled to a piston assembly 830 through an ultrasonic transducer 825 configured to convert electrical signals into ultrasound wave signals and to transmit the ultrasound wave signals to the horn assembly 820 through the booster 826.

In one embodiment, the piston assembly 830 may further include one or more pistons, each having a respective rod, which is movable along its vertical axis to activate the horn assembly 820 and to enable propagation of ultrasound waves at predetermined frequencies (usually from 20 khz to 70 khz) through the ultrasonic transducer 825 to the horn assembly 820. During the ultrasonic welding procedure, the activated horn assembly 820 moves along its vertical axis and contacts the web of material 810 and the anvil 840, thus welding the layers of the web material 810 at the contact points.

In one embodiment, the control cylinder assembly 850 drives the anvil 840 to rotate and controls the rotation of the anvil 840 to follow the advancing speed of the web of material 810. The peripheral surface of the rotary anvil 840 has a predetermined engraved pattern, such as, for example, a rectangle or, in the alternative, any other known geometrical pattern, containing alternating raised surface portions and recessed surface portions at predetermined spacing intervals to enable intermittent contact with the horn assembly 820 and the web of material 810.

Figure 10B:
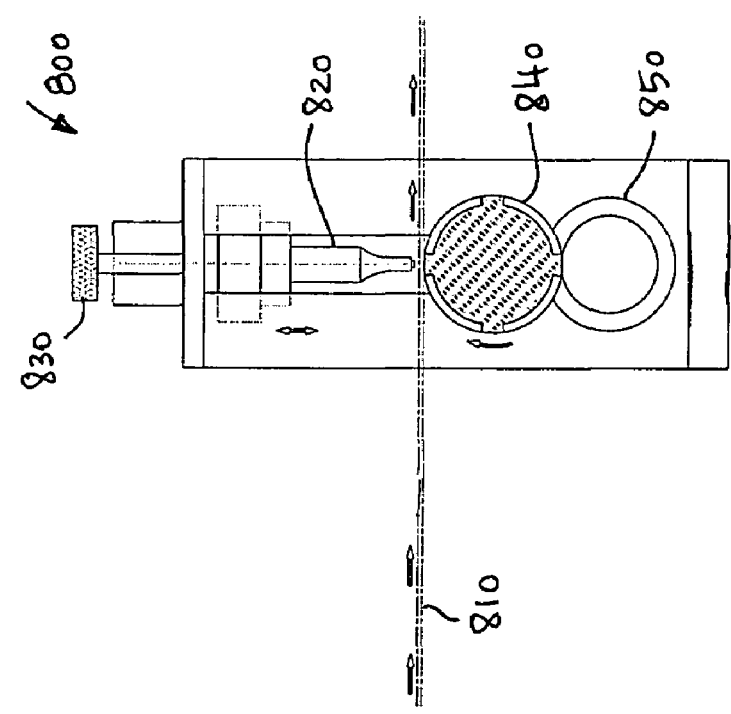
FIG. 10B illustrates a frontal view of the ultrasonic welding apparatus which implements the label structure obtaining method, according to one embodiment of the invention.
Figure 10C:
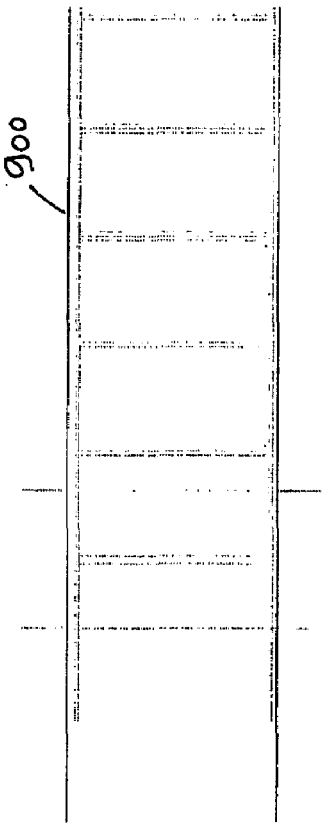
FIG. 10C illustrates the resulting web of material at the output of the ultrasonic welding apparatus, having both longitudinal and transversal welded strips, according to one embodiment of the invention.

FIG. 10B illustrates a frontal view of the ultrasonic welding apparatus which implements the label structure obtaining method, according to one embodiment of the invention. As shown in FIG. 10B, upon activation, the horn assembly 820 is configured to contact the web of material 810 and the rotary anvil 840 based on the ultrasound wave signals received from the ultrasound transducer 825. At the point of contact, the horn assembly 820 welds longitudinal strips along the edges of the web 810, and further welds transversal strips at predetermined spacing intervals across the web 810 corresponding to the predetermined engraved pattern of the rotary anvil 840, to create the edges of the labels. As shown in FIG. 10C, which illustrates the resulting web of material 900 at the output of the ultrasonic welding apparatus 800, the web 900 includes both longitudinal and transversal welded strips, corresponding to the two end cross bands 15, defined between the end labels and the cross edges of the self-adhesive body 10'; the intermediate cross band(s) 15', defined between the labels; and the two longitudinal bands 15", defined between the labels and the longitudinal edges of the self-adhesive body 10'; the bands 15, 15' and 15" being permanently coupled to the respective two end cross bands 5, defined between the end silicone layer regions 4 and the cross edges of the silicone label body 1; the intermediate cross band(s) 5', defined between the silicone layer regions 4, and the two longitudinal bands 5", defined between the silicone layer regions 4 and the longitudinal edges of the silicone-coated label body 1.

FIG. 11A illustrates a sectional view of the ultrasonic welding apparatus which implements the label structure obtaining method, according to an alternate embodiment of the invention. FIG. 11B illustrates a frontal view of the ultrasonic welding apparatus which implements the label structure obtaining method, according to the alternate embodiment of the invention. FIG. 11C illustrates the resulting web of material at the output of the ultrasonic welding apparatus, having both longitudinal and transversal welded strips, according to the alternate embodiment of the invention.

As illustrated in FIGS. 11A-C, in an alternate embodiment, the ultrasonic welding apparatus 800 may include a rotary horn assembly 821 constructed from a material having good ultrasound wave conduction and durability properties, such as, for example, titanium, which moves along its vertical axis and rotates to follow the advancing speed of the web of material 810, and, thus, contacts the web of material 810 and the anvil 840 to weld the layers of the web material 810 at the contact points, as described in detail above in connection with FIGS. 10A-C.

In another alternate embodiment, the ultrasonic welding system 801 shown in FIG. 8 may be configured to include several successive welding stations or apparatuses, as shown in FIGS. 12A-C and 13A-C, each welding station or apparatus to perform successive welding operations onto the web of material.

FIG. 12A illustrates a sectional view of an ultrasonic welding apparatus 1000 which implements the label structure obtaining method, according to an alternate embodiment of the invention. FIG. 12B illustrates a frontal view of the ultrasonic welding apparatus 1000 which implements the label structure obtaining method, according to the alternate embodiment of the invention.

As shown in FIGS. 12A and 12B, the horn assembly 1020 includes at least two horns and the rotary anvil 1040 has a continuous peripheral surface driven by a control cylinder assembly 1050. The piston assembly 1030 and the control cylinder assembly 1050 are similar to the piston assembly 830 and the cylinder assembly 850, respectively, both being described in great detail in connection with FIG. 10A. The web of material 1010 advances through the welding apparatus 1000 and longitudinal strips are welded continuously along the web of material 1010, as shown in FIG. 12C, which illustrates the resulting web of material 1060 at the output of the ultrasonic welding apparatus 1000.

FIG. 13A illustrates a sectional view of an ultrasonic welding apparatus 1100 which implements the label structure obtaining method, according to an alternate embodiment of the invention. FIG. 13B illustrates a frontal view of the ultrasonic welding apparatus 1100 which implements the label structure obtaining method, according to the alternate embodiment of the invention.

As shown in FIGS. 13A and 13B, the horn assembly 1120, the rotary anvil 1140, the piston assembly 1130, and the control cylinder assembly 1150 are similar to the horn assembly 820, the rotary anvil 840, the piston assembly 830 and the cylinder assembly 850, respectively, being described in detail in connection with FIG. 10A. The web of material 1110 advances through the welding apparatus 1100 and transversal strips are welded at predetermined spacing intervals along the web of material 1110, as shown in FIG. 11C, which illustrates the resulting web of material 1160 at the output of the ultrasonic welding apparatus 1100.

In one embodiment, a succession of a welding apparatus 1000 and a welding apparatus 1100 forms a web of material similar to the web of material 900 described in detail in connection with FIG. 10C, having both longitudinal and transversal welded strips, corresponding to the two end cross bands 15, defined between the end labels and the cross edges of the self-adhesive body 10'; the intermediate cross band(s) 15', defined between the labels; and the two longitudinal bands 15", defined between the labels and the longitudinal edges of the self-adhesive body 10'; the bands 15, 15' and 15" being permanently coupled to the respective two end cross bands 5, defined between the end silicone layer regions 4 and the cross edges of the silicone label body 1; the intermediate cross band(s) 5', defined between the silicone layer regions 4, and the two longitudinal bands 5", defined between the silicone layer regions 4 and the longitudinal edges of the silicone-coated label body 1.

Within the basic embodiment described above, the label and method which are the subject of this invention, may present changes related to materials, dimensions, constructive and/or configuration details, functional and/or decoration, changes of proceeding stages and others, without being out of the scope of the requested protection.

According to this, the body of the inner label 10 containing gift, coupon or similar products may be made from plastic, in this case of BOPP, PVC, polyethylene, polyester or other normally used products. The adhesive comprising the adhesive layer 13 can be any of those normally used in the manufacture of self-adhesive articles, such as hot melt, acrylic and others. The label body 1 may be of plastic with one of its faces covered with silicone (silicone-coated) or others normally used as supporting and protection tape, liner, in self-adhesive articles. The label may be intended to be applied on miscellaneous articles, such as food, cleaning, hygiene and other products. Inner labels 10 may be provided in any proper quantities in each label and, when containing gifts, may be pictures or decals or others that contain any appeal to the consumer of the product containing the label. When the inner labels contain coupons, they may be intended to the participation in a contest of prizes or other promotional campaigns.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for obtaining a label structure comprising the steps of:
    providing a self-adhesive material tape reel of a type originally used for the obtaining of labels or other self-adhesive products, with a predetermined width and comprising a silicone-coated plastic tape (1'); an intermediate silicone layer (4') arranged in an inner surface of tape (1'); an intermediate pressure-sensitive adhesive layer (13'), glued so as to be detached on the silicone layer (4'); and of a plastic tape (10") opposite to the silicone-coated plastic tape (1'), which contains a pressure-sensitive adhesive layer (13') and unwind said self-adhesive material tape from an unwinder located at the inlet end of a manufacturing equipment, making the traction thereof through a rewinder located at the opposite end of the equipment, so as to cause such tape to pass through the several manufacturing stages;
    printing on the surface of the silicone-coated tape (1') facing outwards, opposite to that containing the silicone layer (4'), a succession of prints forming labels (2'), properly spaced from each other and in intervals between said prints corresponding to one of the label ends, printing marks (20), which work in collaboration with optical reader in the label application operation;
    printing on an outer surface of the self-adhesive tape (10"), opposite to that containing the adhesive layer (13'), prints at regular intervals forming the inner labels (10) containing gifts or coupons or similar products;
    coupling predetermined portions of the silicone layer (4') of the tape (1') to corresponding portions of the self-adhesive tape (10') through an ultrasonic welding process, thereby inhibiting the silicone from the cross bands and from the two side longitudinal bands of the silicone layer (4'), of the silicone-coated tape (1'), which will form the back end cross bands (5), intermediate transversal bands (5') and longitudinal bands (5"), such that the silicone layer (4) of the silicone-coated tape (1') and the end cross bands (15), intermediate cross bands (15') and longitudinal bands (15") of said self-adhesive tape (10") are coupled so as not to be detached, respectively, over the end cross bands (5), intermediate cross bands (5') and longitudinal bands (5");
    cutting (14') the self-adhesive tape (10") without cuffing the silicone-coated tape (1') and without extracting the bands arising from the labels to define in said self-adhesive tape (10") the shapes of the self-adhesive inner labels (10) and the end cross bands (15), intermediate cross band (15') and longitudinal bands (15"); and
    rewinding the tape of labels when they are supplied in the form of a label tape or cut of the label tape when they are supplied already cut in the form of individual labels.

2. A method comprising:
    continuously advancing a self-adhesive web of material at a predetermined speed along a path between an ultrasonic horn assembly and a rotary anvil, said self-adhesive web of material of a type originally used for the obtaining of labels or other self-adhesive products, with a predetermined width and comprising a silicone-coated plastic tape; an intermediate silicone layer arranged in an inner surface of said silicone-coated plastic tape; an intermediate pressure-sensitive adhesive layer glued so as to be detached on said silicone layer; and of a plastic tape opposite to said silicone-coated plastic tape, which contains a pressure-sensitive adhesive layer, a surface of said silicone-coated tape facing outwardly, opposite to that containing said silicone layer, being printed in a succession of prints to form a plurality of labels, properly spaced from each other and in intervals between said prints corresponding to one of the label ends, printing marks, which work in collaboration with an optical reader in the label application operation, an outer surface of said self-adhesive plastic tape, opposite to that containing said adhesive layer, being printed at regular intervals to form inner labels containing gifts or coupons or similar products; and
    activating said ultrasonic horn assembly to move along its vertical axis and to transmit ultrasound wave signals when contacting said web of material and said rotary anvil, said ultrasonic horn assembly to weld predetermined strips onto said web of material, said predetermined strips inhibiting silicone from cross bands and from side longitudinal bands of said silicone layer of said silicone-coated plastic tape, which will form back end cross bands, intermediate transversal bands and longitudinal bands, such that said silicone layer of said silicone-coated plastic tape and end cross bands, intermediate cross bands, and longitudinal bands of said self-adhesive tape are permanently coupled, respectively, over said end cross bands, intermediate cross bands, and longitudinal bands of said silicone layer of said silicone-coated plastic tape.

3. The method according to claim 2, further comprising:
    cutting said self-adhesive tape without cutting said silicone-coated plastic tape and without extracting said bands arising from the labels to define in said self-adhesive tape shapes of said self-adhesive inner labels and said end cross bands, intermediate cross bands, and longitudinal bands; and rewinding said tape of labels when said labels are supplied in the form of a label tape or cut from said label tape when said labels are supplied already cut in the form of individual labels.

4. The method according to claim 2, wherein said ultrasonic horn assembly further comprises at least one non-rotary ultrasonic horn.

5. The method according to claim 2, wherein said ultrasonic horn assembly further comprises at least one rotary ultrasonic horn.

6. The method according to claim 2, wherein a peripheral surface of said rotary anvil further comprises a predetermined engraved pattern having alternating raised surface portions and recessed surface portions at predetermined spacing intervals to enable intermittent contact with said ultrasonic horn assembly and said web of material.

* * * * *